(12) United States Patent
Velázquez García-López

(10) Patent No.: US 12,073,368 B2
(45) Date of Patent: Aug. 27, 2024

(54) SYSTEM AND METHOD FOR SELECTING SUPPLIERS AND FOR SCHEDULING MEETINGS REMOTELY

(71) Applicant: Beyond the Reset, S.A.P.I. de C.V., Mexico City (MX)

(72) Inventor: Agustin Manuel Velázquez García-López, Mexico City (MX)

(73) Assignee: BEYOND THE RESET, S.A.P.I. DE C.V., Mexico City (MX)

( * ) Notice: Subject to any disclaimer, the term of this patent is extended or adjusted under 35 U.S.C. 154(b) by 850 days.

(21) Appl. No.: 17/053,831

(22) PCT Filed: May 9, 2019

(86) PCT No.: PCT/IB2019/000345
§ 371 (c)(1),
(2) Date: Apr. 9, 2021

(87) PCT Pub. No.: WO2019/215496
PCT Pub. Date: Nov. 14, 2019

(65) Prior Publication Data
US 2021/0233038 A1   Jul. 29, 2021

(30) Foreign Application Priority Data
May 9, 2018   (MX) .......................... A/2018/005845

(51) Int. Cl.
*G06Q 10/10*      (2023.01)
*G06F 16/2455*    (2019.01)
(Continued)

(52) U.S. Cl.
CPC ..... *G06Q 10/1095* (2013.01); *G06F 16/2455* (2019.01); *H04L 67/1097* (2013.01);
(Continued)

(58) Field of Classification Search
CPC ............................. G06Q 10/00; G06Q 90/00
See application file for complete search history.

(56) References Cited

U.S. PATENT DOCUMENTS

2008/0082980 A1   4/2008   Nessland et al.
2008/0195605 A1*  8/2008   Wolf-Soffer ........... G06Q 30/06
                                                      707/999.005
(Continued)

FOREIGN PATENT DOCUMENTS

WO   0139015 A2   5/2001
WO   0221227 A2   3/2002
(Continued)

OTHER PUBLICATIONS

Int'l Search Report and Written Opinion issued Aug. 28, 2019 in Int'l Application No. PCT/IB2019/000345.

*Primary Examiner* — Arif Ullah
(74) *Attorney, Agent, or Firm* — Panitch Schwarze Belisario & Nadel LLP; Erin M. Dunston

(57) ABSTRACT

A system for selecting providers and scheduling meetings remotely is described, comprising an application server; at least one provider device; and at least one user device; wherein the application server, at least one provider device and at least one user device, intercommunicate with each other, through a communication network. The application server includes at least one general storage unit comprising a user profile memory block, where the information related to the users who connect to the server through at least one user device is stored; a provider profile memory block, where all the information of the providers that connect to the application server through at least one provider device is stored; a query storage unit, to store all the information related to the queries made by users; a proposal storage unit, to store all the information related to the proposals made by the providers; and, at least one information processing (Continued)

means, to communicate with the at least one user device and the at least one provider device and interact with the other elements contained in the application server.

17 Claims, 2 Drawing Sheets

(51) Int. Cl.
  *G06Q 10/1093* (2023.01)
  *H04L 67/1097* (2022.01)
  *H04L 67/141* (2022.01)
  *H04L 67/306* (2022.01)
  *H04W 84/12* (2009.01)

(52) U.S. Cl.
  CPC .......... *H04L 67/141* (2013.01); *H04L 67/306* (2013.01); *H04W 84/12* (2013.01)

(56) References Cited

U.S. PATENT DOCUMENTS

| | | | |
|---|---|---|---|
| 2016/0247126 A1* | 8/2016 | Gehrke | G06Q 10/1095 |
| 2016/0335694 A1* | 11/2016 | Catino | G06Q 10/063112 |
| 2018/0039950 A1* | 2/2018 | Kashyap | G06Q 30/0625 |

FOREIGN PATENT DOCUMENTS

| | | |
|---|---|---|
| WO | 03032192 A1 | 4/2003 |
| WO | 2017049405 A1 | 3/2017 |

\* cited by examiner

SYSTEM AND METHOD FOR SELECTING SUPPLIERS AND FOR SCHEDULING MEETINGS REMOTELY

FIELD OF THE INVENTION

The present invention relates to systems that allow a user to select a service provider among various service categories and among a plurality of providers, remotely and using a mobile device, such as professional consultants, and more particularly is related to a system and method for selecting providers and calendarizing meetings remotely.

BACKGROUND OF THE INVENTION

In a so complex society as that we currently live in, it is common that during our daily activities, that the need arises to find a professional service provider, such as a professional consultant, who is suitable to our specific needs.

These needs may vary depending on the person who is looking for the specific service, since the time, cost, availability, quality, prestige, and the proximity of the provider, can be a factor to decide alone.

A few years ago, it was very easy to simply seek a recommendation from a friend or relative, to have a trusted provider, but as times have changed and the services that may be needed become more complex and specific, it is more difficult to go to ask for recommendations or even find someone capable of providing a specific service with the quality, cost, quality, proximity, and availability that we expect.

Likewise, it is an unnecessary waste of resources, having to contact each of a set of service providers directly, to find the one that best suits our specific needs (experience, quality, availability, cost, etc.).

On the other hand, in the field of modern society, it is very common for a person to rely on online tools (through the Internet), to be able to search for professional service providers; however, the information currently found by the online media may be vague and imprecise, since it does not provide the user with real information related to the cost, quality, proximity or availability of the specified service provider.

These online tools can be among others: a) online search, which will give all those companies or professionals who are dedicated zo providing a required service, in this case the client will have to review each site found separately, without being able to view comments from previous users or have access to a fixed rate; b) use of a scheduling resource software, in which service companies can allow their clients to have online access to appointment scheduling calendars in almost real time, but this also refers to the fact that the user must enter to this resource in each company separately, so the failures in these tools are similar to those of Internet sites.

In the same way, there is currently the "Ask a Lawyer" application, which offers a system where the user, depending on its geographical situation, can find assistance from a legal professional, by means of a chat through an application on a device mobile for exchange of questions and answers, so that guidance can be found to solve a legal problem. However, this application does not provide the user with the possibility of having access to more than one proposal simultaneously, having to consult a professional at the same time.

Also, this application does nor provide the technical feature of gathering proposals from different providers to give the user the opportunity to choose the option that best suits the needs.

On the other hand, in the United States Patent Application US2008082980 (Nessland et al), a system and method for the use of standardized filters and messages is described, to identify and schedule appointments in the aggregated resource planning applications. However, this application fails to disclose a system and method to filter providers according to pre-established rankings, as well as it fails to disclose a system and method to select providers and schedule meetings where the same provider can be found in different product categories.

Likewise, this application also fails to disclose a system where all the information databases of both users and providers, as well as information on categories and provider rankings, are located on a remote server. In the same way, this patent application does not include the characteristic that the user can send its needs to a pool of providers, who will answer each one, with a proposal according to the user needs and what each provider of this pool is able to offer.

By virtue of the foregoing, it has sought to eliminate the drawbacks of the prior art, developing a system and method for selecting providers and scheduling meetings remotely, which allows intercommunication between various devices and electronic elements that interact with the system. such as mobile user devices, Internet servers, computers, and expert mobile devices.

OBJECT OF THE INVENTION

It is an object of the present invention to provide a system and method for selecting providers and scheduling meetings remotely, which allows a user, when there is a need to hire a professional service, to access a wide variety of providers, which are already previously classified into service categories.

It is another object of the present invention to provide a system and method for selecting providers and scheduling meetings remotely, which allows a user to have access to providers that provide quality services and that are organized with respect to a range of conformity with the expected quality in the services received from each of these providers.

Another object of the present invention is to provide a system and method for selecting providers and scheduling meetings remotely, in which each provider can be included in more than one category, so that the rank of each professional can be different related to each of the categories in which it is mentioned.

It is an object of the present invention to provide a system and method for selecting providers and scheduling meetings remotely, which allows each provider to have a calendar hosted in an application database, which can be synchronized remotely with other calendars and be used by the user to schedule an appointment with the selected provider.

It is another additional object of the present invention, to provide a system and a method for selecting providers and scheduling meetings remotely, which allows a user to transmit its needs to a pool of providers, which can respond to the requirement with a proposal based on their experience, availability, prestige, and cost of the service, so that the user can choose the provider that best suits the needs.

SUMMARY OF THE INVENTION

The system and method for selecting providers and scheduling meetings remotely of the present invention, allows a user to access information from a plurality of providers remotely, so that it can be select one based on needs and specific capabilities of the provider.

The user of the system uses a mobile device to access a remote application server, where a provider search is performed in a provider database, so that the user can select the service provider that best suits its needs. The search can be carried out considering the following: the category of service that the user needs, the provider availability to serve the user, the service quality level of the provider, the location of the provider and the costs related to the services provided by each specific provider.

The user can search by the required service category, and the system can provide suggestions for different providers with different ranges or levels of service, considering the following: the user history, the user profile, the user location, and the provider availability.

Once the user selects a provider, the user has access to the provider calendar, where the user can schedule an appointment with the provider at the times available in the calendar, this calendar will be synchronized in real time with the user calendar and with the provider calendar. Likewise, the system will send a notice to the provider that a user has selected it and has scheduled an appointment. In a further embodiment of the present invention, the user can schedule calls and the service provider can also customize its availability to receive or schedule calls.

The range in which the provider is, may be linked to a provider service rate, where the service includes, among other things, having scheduled the appointment or the call and where all the providers that are in the same range will have the same rate. It is important to mention that the provider decides in which range it will be placed in the system to be located by the user. Likewise, the user may make a review of the quality of the service provided by the provider, so that this review can be seen by all users who access the provider profile.

In another embodiment of the present invention, the user will be able to store in the application, information related to at least one payment method, so that once the service provider is selected using the method of the present invention and the payment method, the system will automatically charge the user the rate associated with the provider rank. Once the funds are received, the application will subsequently make a transfer to a bank account associated with the provider.

In another embodiment of the present invention, the user will be able to access the application and select one or more categories of the service that is required and will be able to provide more specific information about the service that is required. All this information will be compiled in an electronic document, which will be sent to a pool of providers of the desired category, so that each of the providers in this pool can prepare a proposal to send it to the user.

The user will then have a set of proposals from various providers and will have the opportunity to choose the proposal that best suits its specific needs (price, availability, prestige, quality, etc.). In an additional embodiment of the invention, when the user chooses the proposal that best suits its specific needs and once the funds have been received for the amount of the proposal, the system will make a transfer to the bank account associated with the provider.

DESCRIPTION OF THE FIGURES

The novel aspects that are considered characteristic of the present invention will be particularly set forth in the accompanying claims. However, the invention by itself both for its structure and functionality, together with other objects and advantages thereof, will be better understood from the following detailed description of a preferred embodiment, when read in conjunction with the figures that accompany, in which:

DETAILED DESCRIPTION OF THE INVENTION

Figure 1:
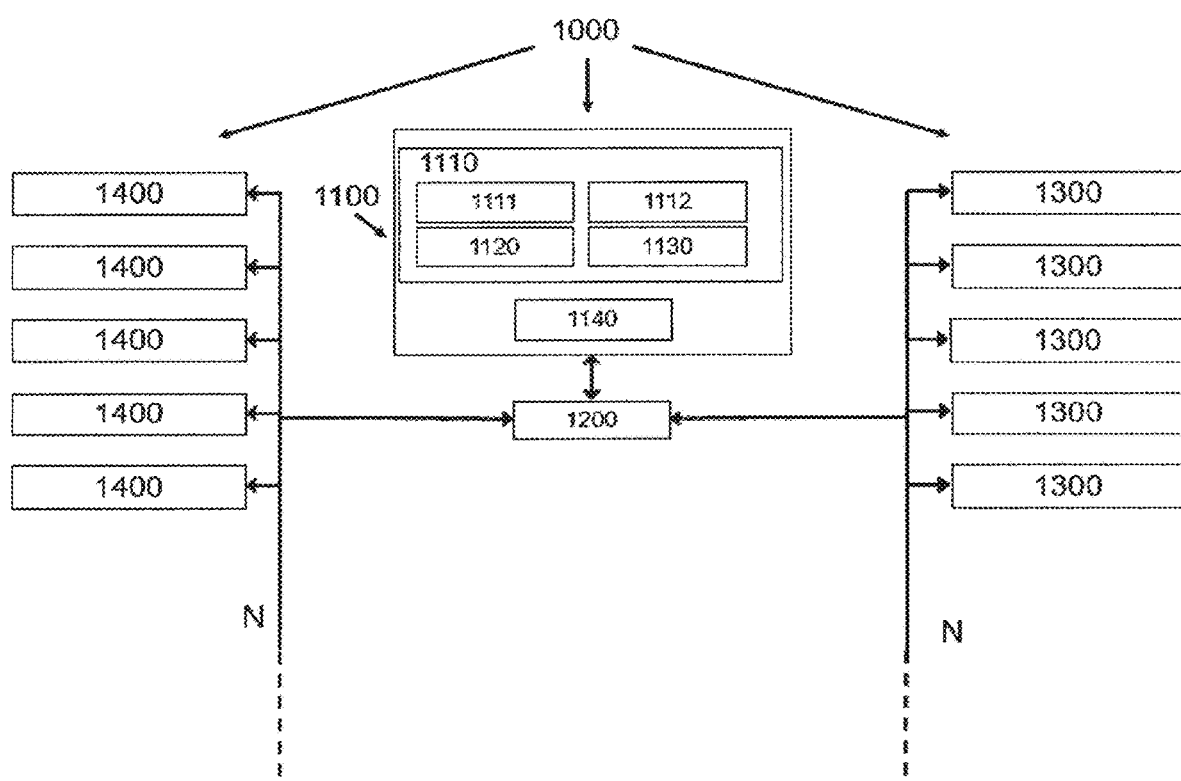
FIG. 1 shows a block diagram of the arrangement of the elements that make up a preferred embodiment of a system and method for selecting providers and calendarizing meetings remotely of the present invention.

Referring to the drawings and particularly to FIG. 1, there is shown a system for selecting providers and calendarizing meetings remotely 1000 of the present invention, which in a preferred embodiment comprises an application server 1100; at least one provider device 1400; and at least one user device 1300; wherein the application server 1100, at least one provider device 1400, and at least one user device 1300, intercommunicate with each other, via a communication network 1200.

The network 1200 can be any computer network that can establish communication between the elements that make up the system of the present invention and which are shown in FIG. 1.

In a preferred embodiment, the network used is the Internet, therefore, for the purposes of the present invention, it can be understood that most of the communications made between the application server 1100 and the user devices 1300 and provider 1400 will be performed wirelessly, either by WI-FI or some other known technology.

The application server 1100 includes at least one general storage unit 1110 that comprises a user profile memory block 1111, which has the function of storing all the information related to the users that connect to application server 1100 through its user device 1300; a provider profile memory block 1112, which has the function of storing all the information related to the providers that connect to the application server 1100 through its provider device 1400; a query storage unit 1120, which has the function of storing all the information related to the queries made by users; a proposal storage unit 1130, which has the function of storing all the information related to the proposals made by the providers; and, at least one information processing means 1140, which has the function of communicating with the at least one user device 1300 and the at least one provider device 1400 and interacting with the other elements contained within the application server 1100.

The information processing means 1140 can also execute computer programs to be able to interact with the user device 1300, the provider device 1400 and the general storage unit 1110.

The general storage unit can be any physical electronic memory capable of storing and using databases of any known and commercially available format.

The at least one user device 1300 and the at least one provider device 1400 can be any computing device that has a screen; a locating means such as a GPS; a calendar; a means for entering information, such as a keyboard or a microphone; an information processing means, such as to execute an application or a computer program to interact with the system and a means to connect to an information network such as the Internet.

The computing device can be included, but is not limited to, in the group comprising: a personal desktop computer, a tablet, a smartphone or a laptop.

The system 1000 is designed to interact with ac least one user device 1300 and at least one provider device 1400, but definitely, there can be more than one user device 1300 and more than one provider device 1400 interacting simultaneously with the system.

In the user profile memory block 1111, the profiles of the users who operate the user devices 1300 to interact with the application server 1100 are stored, each user profile comprises but is not limited to the following information: name, address, age, location, company name, query history, user calendar, last connection of user device 1300, links to pending queries stored in query storage unit 1120, user calendar, links to in force proposals stored in the proposal storage unit 1130, user reviews and ratings, and user banking information.

Each time a user device 1300 accesses the application server, it has the option to edit the information related to its personal data, query, edit and synchronize user device calendar information 1300 with the user profile calendar, query and access information related to the query history, check the status of pending queries and query, and access the proposals that are in force.

Likewise, the user may make and save new queries in the query storage unit 1120, which will be classified as pending queries and may be accessed by the user through the links in its user profile, likewise, the user may access to proposals related to its pending queries which are stored in the proposal storage unit 1130 and choose the proposals that best solve its problem.

Each time a new user uses a new user device 1300 to access the system for the first time, a new user profile is created, where the data corresponding to the profile must be provided, which will be stored in the user profile memory block 1111 along with the profiles associated with other user devices 1300, in this case, the query history, pending queries, and in force proposals associated with this user will be empty, as will the ratings and reviews of the user.

After the user profile is generated, the user can use the user device 1300 to generate queries. Also, each time a user device 1300 connects to the system, the user actual location will be shared to the system so that this information can be used to locate the closest providers.

In provider profile memory block 1112, all provider profiles used by provider devices 1400 to interact with application server 1100 are stored, each provider profile comprises but is not limited to the following information: name, age, address, company name, location, service categories in which the provider operates, provider calendar, provider rank, provider calendar, links to in force queries stored in query storage unit 1120, links to in force proposals stored in proposal storage unit 1130, proposal history, ratings and reviews of the provider.

Each time a provider device 1300 accesses the application server, the provider will have the option to edit information related to their personal data, edit, and synchronize the calendar information of the provider device 1400 with the provider profile calendar, query and access information related to the proposal history, check the status of in force proposals made and query and access new queries made in the system.

Likewise, the provider may make and save new proposals in the proposal storage unit 1130, in accordance with the in force queries that are stored in the query storage unit 1120. Each time a new provider uses a new provider device 1400 to access the system for the first time, a new provider profile is created, where the data corresponding to the provider profile must be provided, which will be stored in the provider profile memory block 1112, along with the profiles associated with other provider devices 1400, in this case there will be no links to in force queries or in force proposals, and the proposal history and ratings and reviews for this provider will be empty.

Once the provider profile is generated, the provider will be automatically eligible to receive queries and generate proposals.

Also, each time a provider device 1400 connects to the system, the provider actual location will be shared to the system for the purposes of being-locatable.

In one embodiment of the invention, each provider is situated in a predetermined level or range (the range of the provider is established by the same provider), since there is a fixed rate associated with each of the ranges of providers.

In a preferred embodiment of the invention, there are at least three different ranges of providers, each associated with a different fixed rate.

The category of services for a provider can be any consulting service but is not limited to one or a combination of the group made up of legal services related to: intellectual property, sports and entertainment, litigation, environmental law, civil and commercial law, economic competition, tax law, agrarian law, criminal law, corporate law, and any other branch related to legal issues.

On the other hand, the processing means 1140 also comprises notification means, which are responsible for sending a notification to a user device 1300 in the following events: a) a provider has created a new proposal related to one of the queries of that specific user; b) the query created by the user is declared finished by the system; c) a meeting with a provider is coming up in accordance with the user profile calendar; and, d) a provider has given the user a rating and/or review.

The criteria for the system to declare a query as completed are the following: a) all the selected providers have made at least one proposal; b) a period of validity determined by the user when creating the query has elapsed; and c) the user has selected a proposal.

Figure 2:
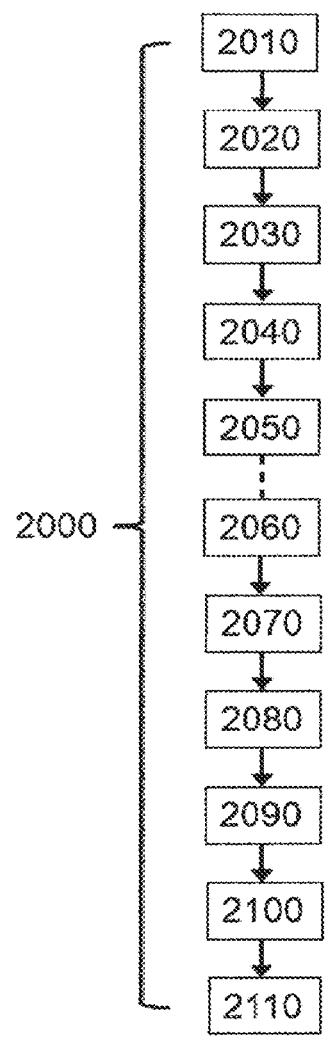
FIG. 2 shows a block diagram of an additional embodiment of the method for selecting providers and calendarizing meetings remotely.

In one of the preferred embodiments of the present invention, a method for selecting providers and scheduling meetings 2000 is described, which is illustrated in FIG. 2. The method includes a first step 2010, in which a user uses a user device 1300 to enter (login) to an application server 1100, to use this login, the user must have a username and password previously established in the system and stored in a portion of the user information memory block 1111 designated for that specific user.

Once the user device is connected to the application server 1100, the user selects in a second step a category 2020 related to the specific service it needs; Once the category has been selected, a third step 2030 is carried out, in which the user uses the user device 1300 to enter information related to the specific need it have, this information refers to the background of its need and a description of the need, the above so that providers can have bases to create their proposals.

Once the user has entered the information related to the query, in a fourth step 2040, the user can add the expiration time of the query and the query access privileges, these privileges can give access to the query but they are not limited to the group comprised of: all system providers; only providers offering services in the same category as the query; only providers that meet a certain rank or level of qualification; only providers that are within a certain radius of proximity to the user; only providers that meet an availability criteria based on the user calendar; only providers manually selected by the user or a combination of any of the above.

Once the user has chosen the query access privileges and defined the expiration time of the query, in a fifth step 2050, the user will be able to save and send the query and store it in the query storage unit 1120, at this time the query will be marked as a pending or open query, likewise, the at least one data processing means 1140 will send an alert of a new query available to each provider device 1300 that has privileges to access that new query created by the user.

Meanwhile, a provider can use the provider device 1400 to, in a first step 2060, enter (login) to an application server 1100. To use this login, the provider must have a provider name and a previously established password in the system and stored in a portion of the provider information memory block 1112 designated for that specific provider.

Once the provider has connected to the application server 1100, in a second step 2070, it can access the queries generated by user devices 1300, which are available to the provider related to this provider device 1400, based on the query access privileges previously established by the users, in this way, a service provider will be able to download on the screen of the provider device 1400, the information related to at least one query and based on the needs described in said query, in a third step 2080 the provider may prepare at least one proposal.

Proposals must include at least one solution to the query made by the client; a provider availability option to schedule a meeting based on the provider calendar availability information stored in the provider profile, once the provider has made their proposal through the provider device 1400, the provider will be able to save and submit its proposal, this proposal will be stored in the proposal storage unit 1130 along with other proposals that other providers have made for this same query, thus creating a set of proposals. In this same third step 2080, the data processing means 1140 will send an alert to the user device 1300 associated with a query each time a provider device 1300 has created a new proposal related to this specific query. There will be no minimum number of proposals that a provider can create for a specific query.

According to a fourth step 2090, the user will be able to use the user device 1300 to access this set of proposals stored in the proposal storage unit 1130 to review each one of them.

In a fifth step 2100, once the user has chosen a proposal from the set of proposals, the system sends a notification to the provider device 1400 that sent the chosen proposal, and simultaneously the system will synchronize the calendars associated with the user device 1300. and the provider device 1400 so that the date included in the proposal remains locked and the meeting between the user and the provider remains thus closed.

In one embodiment of the invention, when a user chooses a proposal, the amount to be deposited associated with the range of the chosen provider is set and transferred from the bank account associated with the bank information stored in the user profile, to the bank account associated with the bank information stored in the provider profile who made this proposal.

A sixth step 2110 is performed once the meeting between a user and a provider has concluded, in this step the user uses the user device 1300 to give a rating and a review to the provider related to the proposal and the service received, this rating and this review may be seen by users who are interested in using them to provide privileges to this provider or as selection criteria for a proposal.

Likewise, in this same step the provider will also give a rating and a review to the user, which will be stored in the user profile and will be seen by the providers when making a proposal to the user. Only those users and providers who have scheduled a meeting through the system will be able to give ratings and reviews.

While a preferred embodiment of the present invention has been described and shown in the foregoing description, it should be emphasized that numerous modifications thereto are possible, without departing from the true scope of the invention.

Therefore, the present invention should not be restricted except as required by the prior art and by the appended claims.

The invention claimed is:

1. A system for selecting providers and scheduling meetings remotely, comprising an application server, at least one user device operated by a user and at least one provider device operated by a provider, which intercommunicate and interact simultaneously with each other through a communication network,
    wherein said at least one user device is a computing device having: a screen, a location means, a calendar, a means for entering information and a means for connecting to a communication network;
    wherein said at least one provider device is a computing device that has: a screen, a location means, a calendar, a means for entering information and a means for connecting to a communication network;
    characterized in that said application server includes:
    a general storage unit comprising:
    a user profile memory block, where information related to users who connect to the application server through the at least one user device is stored;
    a provider profile memory block, where information related to providers that connect to the application server through the at least one provider device is stored;
    a query storage unit, which stores information related to queries made by the users;
    a proposal storage unit, which stores all the information related to proposals made by the providers in response to the queries made by the users; and,
    at least one information processing means, which allows communication with the at least one user device and the at least one provider device and interacts with other elements contained within the application server,
    wherein, in said user profile memory block, the profiles of the users who operate the user devices are stored to interact with the application server, where each user profile includes information on: name, address, age, location, company name, query history, user calendar, last connection of the user device, links to pending queries stored in the query storage unit, user calendar, links to in-force proposals stored in the proposal storage unit, user reviews and ratings and user banking information, and
    wherein each time a user device accesses the application server, the user, by means of said user device, is enabled to:
    edit information related to the user's personal data;

query, edit, and synchronize user device calendar information with the user profile calendar;
query and access information related to the query history;
check status of pending queries;
query and access proposals that are in force;
make and save new queries in the query storage unit, which will be classified as pending queries and will be enabled to be accessed by the user through the links in the user's user profile;
access proposals related to the user's pending queries, which are stored in the proposal storage unit; and,
choose those proposals that best solve the user's problem.

2. The system for selecting providers and scheduling meetings remotely, according to claim 1, further characterized in that the communication network is an Internet network, which is Wi-Fi-type wireless.

3. The system for selecting providers and scheduling meetings remotely, according to claim 1, further characterized in that said information processing means executes computer programs to interact with said at least one user device, said at least one provider device and said general storage unit.

4. The system for selecting providers and scheduling meetings remotely, according to claim 1, further characterized in that said general storage unit is a physical electronic memory capable of storing and using databases of any known and commercially available format.

5. The system for selecting providers and scheduling meetings remotely, in accordance with claim 1, further characterized in that each time a new user uses a new user device to access said system for the first time, a new user profile is created, where the new user provides the data corresponding to said user profile, which will be stored in the user profile memory block along with the user profiles associated with the other user devices of the at least one user device, where the query history, pending queries, and in-force proposals associated with this new user are initially empty, as will the user ratings and reviews; and,
where once said user profile is generated, said new user is permitted to use said user device to generate queries.

6. The system for selecting providers and scheduling meetings remotely, in accordance with claim 1, further characterized in that each time a user device connects to said system, said user device will share the real location of said user to this system, to be able to locate the nearest providers.

7. The system for selecting providers and scheduling meetings remotely, in accordance with claim 1, further characterized in that in the provider profile memory block, profiles of providers that use provider devices are stored to interact with the application server;
where each provider profile comprises information on: name, age, address, business name, location, service categories in which the provider operates, provider calendar, provider range, provider calendar, links to in-force queries stored in the query storage unit, links to in-force proposals stored in the proposal storage unit, proposal history, provider ratings and reviews.

8. The system for selecting providers and scheduling meetings remotely, according to claim 7, further characterized in that each time a provider uses a provider device to access the application server, the provider, by means of said provider device, is enabled to:
edit information related to its personal data;
edit and synchronize information on the provider device calendar with the provider profile calendar;
query and access information related to the provider's proposal history;
check the status of in-force proposals made by the provider;
query and access new queries made in said system;
make and save new proposals in the proposal storage unit.

9. The system for selecting providers and scheduling meetings remotely, in accordance with claim 7, further characterized in that each time a new provider uses a new provider device to access said system for the first time, a new provider profile is created, where the provider provides data corresponding to the provider profile, which will be stored in the provider profile memory block, together with provider profiles associated with other provider devices; and,
where once said provider profile is generated, said new provider will be automatically eligible to receive queries and generate proposals.

10. The system for selecting providers and scheduling meetings remotely, according to claim 1, further characterized in that each time a provider device connects to said system, said provider device shares a real location of a provider associated with said provider device to said system for the purpose of being able to be located.

11. The system for selecting providers and scheduling meetings remotely, in accordance with claim 7, further characterized in that each provider is located at a predetermined level or range, which is established by the same provider, where there is a fixed rate associated with each of the provider predetermined ranges.

12. The system for selecting providers and scheduling meetings remotely, according to claim 7, further characterized in that the category of services offered by providers are consulting services.

13. The system for selecting providers and scheduling meetings remotely, in accordance with claim 12, further characterized in that said consulting services are legal services selected from the group that comprises:
intellectual property, sports and entertainment, litigation, environmental law, civil and commercial law, economic competition, tax law, agrarian law, criminal law and corporate law.

14. The system for selecting providers and scheduling meetings remotely, in accordance with claim 1, further characterized in that the processing means also comprises notification means to send a notification to the at least one user device in the following events:
a) a provider has created a new proposal related to a specific query;
b) a query created by a user is declared terminated by said system;
c) a meeting with a provider is coming up in accordance with a user profile calendar; and,
d) a provider has given a rating and/or a review to the user of the at least one user device.

15. A method for selecting providers and scheduling meetings remotely, which uses the system for selecting providers and scheduling meetings remotely according to claim 1, said method comprising:
receiving at the application server, via the communication network, through a user device of the at least one user device operated by a user, a password, wherein to use said password, said user must have a username and password previously established in said system and stored in a portion of the user profile memory block designated for the user;
receiving at the application server, via the communication network, by means of said user device, a category related to a specific needed service;

receiving at the application server, via the communication network, by means of said user device, information related to a specific need that said user has in the form of a query from said user device, which will serve as a basis for at least one of the providers to create a proposal, wherein the query further includes an expiration time of said query and access privileges of the providers that can access said query, which access privileges are selected from the group consisting of: all providers; only providers that offer services in a category of said query; only providers that meet a certain rank or level of qualification; only providers that are within a certain radius of proximity to said user; only providers that meet an availability criteria based on that user's calendar; only providers selected manually by the user; or combinations thereof;

storing said query in the query storage unit of the application server; and, sending, via the communication network, by means of the at least one data processing means of the application server, an alert of a new query available to each of the provider devices that complies with the access privileges assigned for said query.

16. A method for selecting providers and scheduling meetings remotely, which uses a system for selecting providers and scheduling meetings remotely, comprising an application server, at least one user device operated by a user and at least one provider device operated by a provider, which intercommunicate and interact simultaneously with each other through a communication network, wherein said at least one user device is a computing device having: a screen, a location means, a calendar, a means for entering information and a means for connecting to a communication network;

wherein said at least one provider device is a computing device that has: a screen, a location means, a calendar, a means for entering information and a means for connecting to a communication network;

characterized in that said application server includes:

a general storage unit comprising:

a user profile memory block, where information related to users who connect to the application server through the at least one user device is stored;

a provider profile memory block, where information related to providers that connect to the application server through the at least one provider device is stored;

a query storage unit, which stores information related to queries made by the users;

a proposal storage unit, which stores all the information related to proposals made by the providers in response to the queries made by the users; and, at least one information processing means, which allows communication with the at least one user device and the at least one provider device and interacts with other elements contained within the application server, said method comprising:

receiving at the application server, via the communication network, through a user device of the at least one user device operated by a user, a password, wherein to use said password, said user must have a username and password previously established in said system and stored in a portion of the user profile memory block designated for the user;

receiving at the application server, via the communication network, by means of said user device, a category related to a specific needed service;

receiving at the application server, via the communication network, by means of said user device, information related to a specific need that said user has in the form of a query from said user device, which will serve as a basis for at least one of the providers to create a proposal, wherein the query further includes an expiration time of said query and access privileges of the providers that can access said query, which access privileges are selected from the group consisting of: all providers; only providers that offer services in a category of said query; only providers that meet a certain rank or level of qualification; only providers that are within a certain radius of proximity to said user; only providers that meet an availability criteria based on that user's calendar; only providers selected manually by the user; or combinations thereof;

storing said query in the query storage unit of the application server; and, sending, via the communication network, by means of the at least one data processing means of the application server, an alert of a new query available to each of the provider devices that complies with the access privileges assigned for said query;

receiving at the application server, via the communication network, from a provider device operated by a provider, previously established in said system and stored in a portion of the provider profile memory block designated for the provider;

enabling, by the application server, the provider to access, by means of said provider device, the received query, along with queries generated by other user devices, which are available to said provider based on the access privileges assigned for each query;

downloading over the communication network to said provider device and causing to be displayed on the screen of said provider device, the information related to at least one of the queries accessed by the provider;

receiving, via the communication network, at the application server, from said provider device, at least one proposal based on the needs described in said at least one downloaded query, wherein said proposal includes at least one solution to said query and a provider availability option for scheduling a meeting based on the provider calendar availability information stored in the provider profile;

storing said at least one proposal in the proposal storage unit of the application server together with any other proposals that other providers have made for said query, and thus creating a set of proposals;

sending over the communication network, by means of the at least one data processing means of the application server, an alert to particular one of the at least one user device associated with a particular query each time a provider device has created a new proposal related to the particular query;

enabling access, by means of said user device operated by a particular user associated with the particular query, the set of proposals stored in the proposal storage unit to be able to review each one of them;

receiving, via the communication network, a selection, by means of said user device, of one of the proposals that make up said set of proposals;

sending over the communication network, by the application server, a notification to the provider device that sent the selected proposal, and simultaneously synchronizing the calendars associated with the user device that sent the particular query and said provider device that sent the selected proposal to enable establishment of a meeting between the user associated with the user device that sent the particular query and the provider associated with the provider device that sent the selected proposal.

17. The method for selecting providers and scheduling meetings remotely, according to claim 16, the method further comprising:

once a meeting between said user associated with the user device that sent the particular query and said provider associated with the provider device that sent the selected proposal is held and concluded:

receiving by the application server, via the communication network, by means of said user device that sent the particular query, a rating and a review related to said proposal and service received, and storing the rating and the review in a corresponding provider profile, where said rating and said review is permitted to be seen by users who are interested in using services of the provider associated with the provider device that sent the selected proposal; and, receiving by the application server, via the communication network, by means of said provider device that sent the selected proposal, a rating and a review of said user associated with the user device that sent the particular query, and storing the rating and the review in the corresponding user profile, where said rating and said review are permitted to be seen by providers prior to making a proposal to the user in response to a query from the user;

where only those users and providers who have conducted meetings are permitted to give ratings and reviews.

* * * * *